(12) United States Patent
O'Flynn

(10) Patent No.: US 9,061,568 B2
(45) Date of Patent: Jun. 23, 2015

(54) GOLF CART VISOR

(71) Applicant: GOLF CART VISORS LLC, The Villages, FL (US)

(72) Inventor: John O'Flynn, The Villages, FL (US)

(73) Assignee: GOLF CART VISORS, LLC, The Villages, FL (US)

( * ) Notice: Subject to any disclaimer, the term of this patent is extended or adjusted under 35 U.S.C. 154(b) by 0 days.

(21) Appl. No.: 14/318,650

(22) Filed: Jun. 29, 2014

(65) Prior Publication Data

US 2015/0008696 A1  Jan. 8, 2015

Related U.S. Application Data

(60) Provisional application No. 61/842,059, filed on Jul. 2, 2013.

(51) Int. Cl.
*B60J 3/02* (2006.01)

(52) U.S. Cl.
CPC ...................... *B60J 3/0217* (2013.01)

(58) Field of Classification Search
CPC .............................. B60J 3/0217; B60J 3/0213
USPC ............................ 296/97.4, 97.6, 97.9, 97.11
See application file for complete search history.

(56) References Cited

U.S. PATENT DOCUMENTS

| | | | | |
|---|---|---|---|---|
| 1,391,915 A * | 9/1921 | Starr et al. | .................... | 296/97.9 |
| 1,461,289 A * | 7/1923 | Primrose | .................... | 296/97.11 |
| 1,941,032 A * | 12/1933 | Knowles | .................... | 248/276.1 |
| 2,707,072 A | 4/1955 | Sims | | |
| 4,521,051 A | 6/1985 | Cody et al. | | |
| 4,650,238 A | 3/1987 | Healey | | |
| 4,845,809 A * | 7/1989 | Pillifant, Jr. | .................... | 16/259 |
| 5,301,856 A | 4/1994 | Newsome | | |
| 5,344,020 A | 9/1994 | Ferguson | | |
| 5,419,604 A * | 5/1995 | Clark | .......................... | 296/97.9 |
| 5,772,272 A | 6/1998 | Faddis | | |
| 6,290,280 B1 * | 9/2001 | Riekse | ........................ | 296/97.6 |
| 6,328,370 B1 * | 12/2001 | Kim | ........................... | 296/97.11 |
| 2006/0138184 A1 * | 6/2006 | Floch et al. | .................... | 224/312 |
| 2009/0266854 A1 * | 10/2009 | Schmidt | ....................... | 224/274 |

* cited by examiner

*Primary Examiner* — Dennis H Pedder
(74) *Attorney, Agent, or Firm* — Mitchell J. Mehlman, Esq.

(57) ABSTRACT

Improved visors for mounting to golf carts are provided. A shade member can be connected to at least one mounting bracket. The bracket can be configured to include two mounting arms each having a substantially flat portion including an aperture therethrough and an arcturate portion. A mounting member can be fixedly connected to a golf cart frame and rotationally connected to the shade member thereby allowing rotation of the shade member to a plurality of stable positions.

7 Claims, 6 Drawing Sheets

FIG. 4
FIG. 5
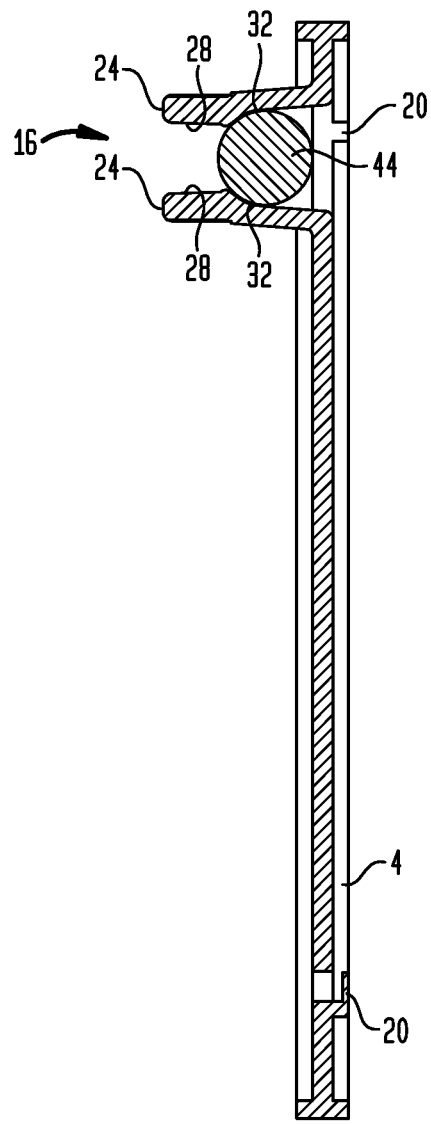
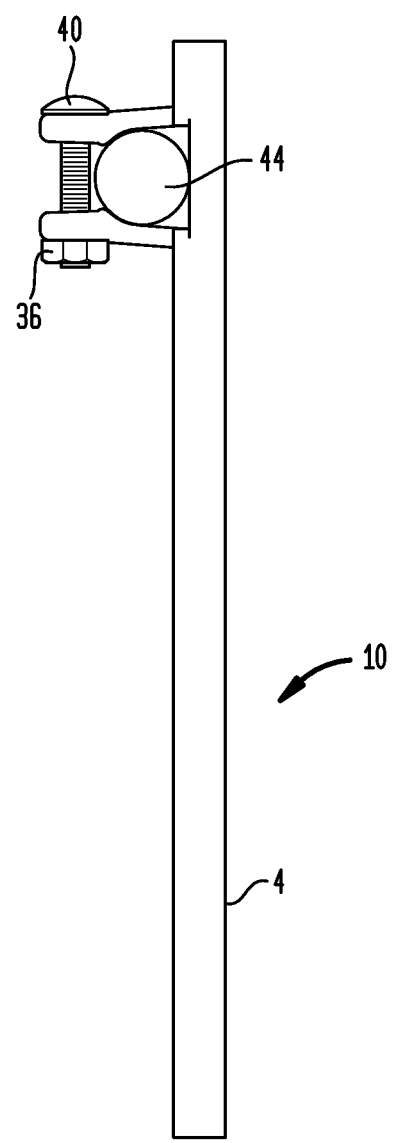

GOLF CART VISOR

CROSS-REFERENCE TO RELATED APPLICATION

This application claims priority of U.S. Provisional Application No. 61/842,059, titled "Golf Cart Visor", filed Jul. 2, 2013, the disclosure of which is incorporated herein by reference in its entirety.

BACKGROUND

In addition to being employed for the game of golf, golf carts are often used in in golf cart communities for transportation to, for example, shopping, restaurants, doctors, or hospitals. Various attempts have been made to overcome the problem of shielding golf cart drivers and passengers from the glare of the sun to improve safety and comfort.

Some known devices modify vehicle sun visors, and even include certain modified sun visors for golf carts. Examples of such devices include U.S. Pat. No. 2,707,072 to Sims for "Article Holder for Sun Visors"; U.S. Pat. No. 4,521,051 to Cody et al. for "Visor with Mirror and Storage Means"; U.S. Pat. No. 4,650,238 to Healey for "Roof for Golf Cart"; U.S. Pat. No. 5,301,856 to Newsome for "Sun Visor Organizer"; U.S. Pat. No. 5,344,020 to Ferguson for "Storage Device for Golf Carts"; and U.S. Pat. No. 5,772,272 to Faddis for "Golf Cart Sun Visor and Storage Device".

While those above described devices may work for their intended purposes, there is a need for improved sun visors for golf carts which have the benefit of some known devices, yet none of the shortcomings.

Therefore, the present invention is directed to improved sun visors adapted for use on golf carts or similar vehicles.

BRIEF DESCRIPTION OF THE DRAWINGS

FIGS. 4 and 5 depict side views of the present invention including a fastener as shown in FIG. 5.

SUMMARY OF THE DISCLOSURE

Figure 1:
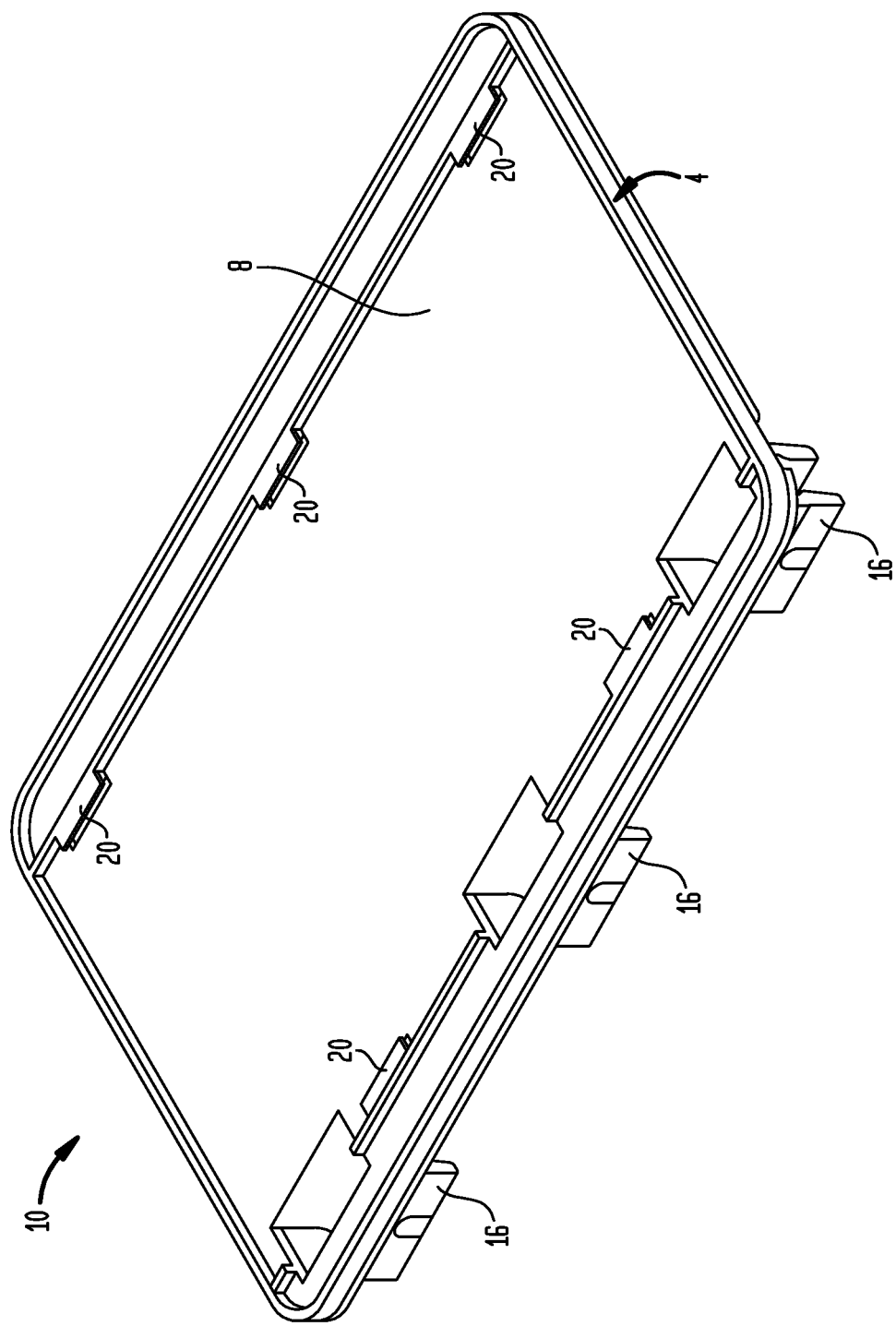
FIG. 1 depicts an isometric view of one embodiment of the present invention.

In one aspect of the present invention, a sun visor adapted for a golf cart comprises a shade member. The shade member can have an outer surface and an inner surface. At least one mounting bracket can be connected to the shade member. The at least one mounting bracket can be configured to include at least two mounting arms. The at least two mounting arms each can have a substantially flat distal portion including an aperture therethrough and an arcturate or curved proximal portion. The at least two mounting arms can protrude from the shade member such that an aperture is formed between the arms.

A universal mounting member can include an elongated rod. The rod can be connected to a flange. The flange can include at least one aperture therethrough for connecting the mounting member to a golf cart frame. The shade member can be rotationally connected to the mounting member by at least one fastener protruding through the apertures locating in the substantially flat portions of the mounting arms which can be frictionally retained substantially within the curved portions of the mounting arms thereby allowing rotation of the shade member to a plurality of fixed sun blocking positions.

In one embodiment of the invention, the flange can be configured to be substantially parallel to the mounting member.

In another embodiment of the invention, the flange can be configured to be substantially parallel to the mounting member.

In some embodiments of the present invention, the shade member can be opaque.

In other embodiments of the present invention, shade member can be translucent.

In certain embodiments of the present invention, the shade member can be transparent.

Yet in other embodiments of the present invention, the shade member can be a light polarizing lens.

In some embodiments on this aspect of the invention, the sun visor can further comprise a plurality of clips for retaining a plaque on the outer surface of the shade.

In some embodiments, the at least one mounting bracket can be two brackets.

In some other embodiments, the at least one mounting bracket can be three brackets.

In certain embodiments of this aspect of the invention, the at least one mounting bracket can be integrally molded with the shade member.

In other embodiments of the instant invention, the at least one bracket and the shade can comprise an ultra-violet resistant polycarbonate material.

In one embodiment of this aspect of the invention, the at least one mounting bracket can comprise a first, a second, and a third mounting bracket. The second bracket can include arms having a solid flat portion. The shade can be fastened to the universal mounting member using the first and said second brackets. The arms can capture the mounting member and can be tightened or adjusted to provide a sufficient frictional force to allow for rotation of the shade to a plurality of rotational positions. The shade can be stable at any of the plurality of rotational positions.

In another aspect of the present invention, a sun visor adapted for a golf cart comprises a sun blocking member including an inner side and an outer side. At least one retaining member can be attached to the inner side of the sun blocking member. The at least one retaining member can have a first arm and a second arm. The first and second arms each can have an aperture therethrough. The first and second arms can be disposed substantially perpendicular to the sun blocking member. Each arm can include a first substantially flat region and a second curved region. At least one fastener can be disposed within the apertures. The curved regions can engage a substantially circular bar mounted on a golf cart. The at least one fastener can be used to reversibly install or remove the sun visor from a golf cart.

In one embodiment of this aspect, the shade member can be opaque, translucent, or transparent.

In another embodiment, the shade member can be a light polarizing lens.

In some embodiments, the sun visor can comprise a plurality of clips for retaining a plaque on the outer side of the shade or on the inner side of the shade.

In some embodiments, the at least one retaining member can be integrally molded with the shade member.

In another aspect of the present invention a golf cart sun visor kit comprises a sun visor adapted for a golf cart. A shade member can have an outer surface and an inner surface. At least one mounting bracket can be connected to the shade member. The at least one mounting bracket can be configured to include at least two mounting arms. The at least to mounting arms each can have a substantially flat distal portion including an aperture therethrough and an arcturate or curved proximal portion. The at least two mounting arms can protrude from the shade member such that an aperture is formed between the arms. A universal mounting member can include an elongated rod. The rod can be connected to a flange that includes at least one aperture therethrough. The flange can be connected to a golf cart frame using at least one fastener. The shade member can be rotationally connected to the mounting member by at least one fastener protruding through the apertures in the substantially flat portions of the mounting arms. The rod can be frictionally retained substantially within the curved portions of the mounting arms allowing for rotation of the shade member to a plurality of fixed sun blocking positions. The kit can include at least one fastener for mounting the at least one mounting bracket to the universal mounting member and at least one fastener for mounting the flange to the gold cart frame. The kit can include an installation instruction sheet and a package for containing the kit.

DETAILED DESCRIPTION

The invention is directed to a sun visor for a golf cart, in particular, a device used to shield a golf cart driver or passenger from the sun. The invention is advantageous in that it improves golf cart safety in general, and can help to speed up play on the golf course. The device can be installed using a universal mounting rod as described herein. This allows a golf cart user to install the device on almost any new or pre-existing golf cart frame without the need for costly and time consuming customization. Similarly, the device may be installed directly onto a mirror bar or a cross bar commonly found on many golf carts spanning the frame members across the front portion of the cart. FIGS. 1-16 depict several non-limiting embodiments of the instant invention as described below.

Figure 2:
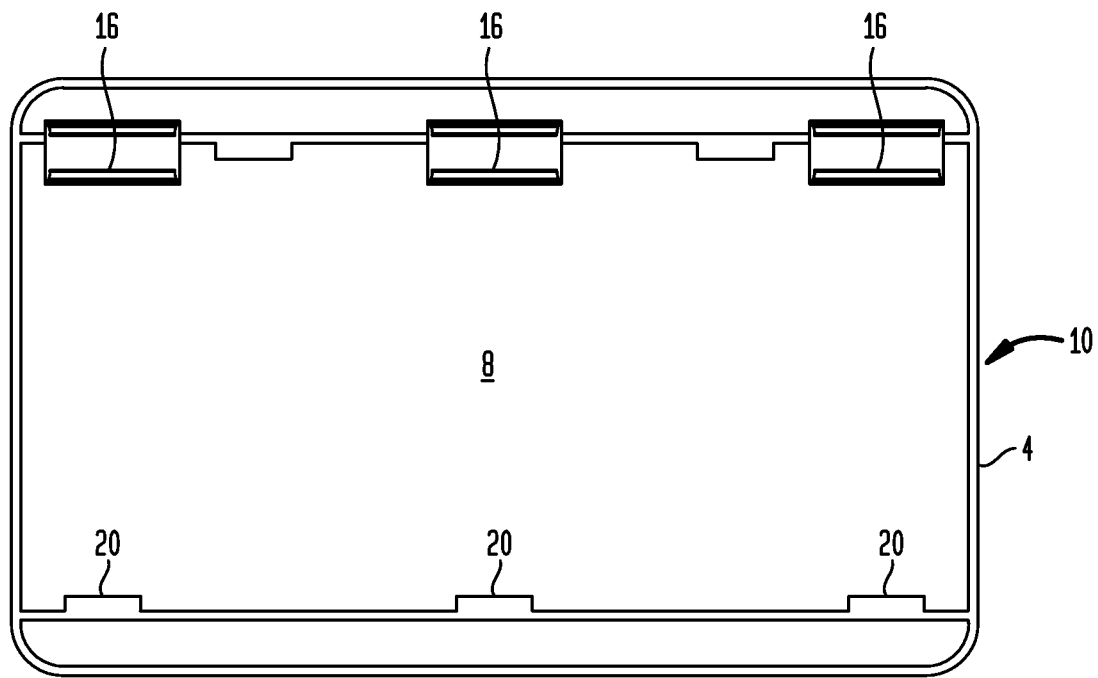
FIGS. 2 and 3 depict plan views of opposing sides of the embodiment shown in FIG. 1.
Figure 3:
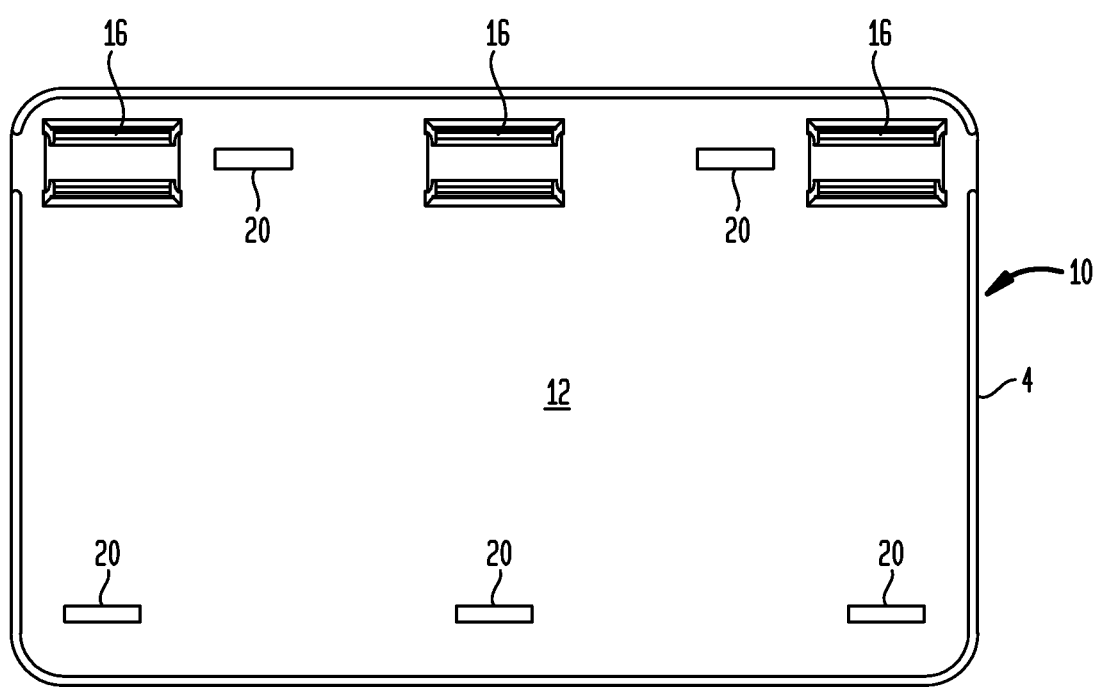
Figures 6, 7, 8, 9, 10:
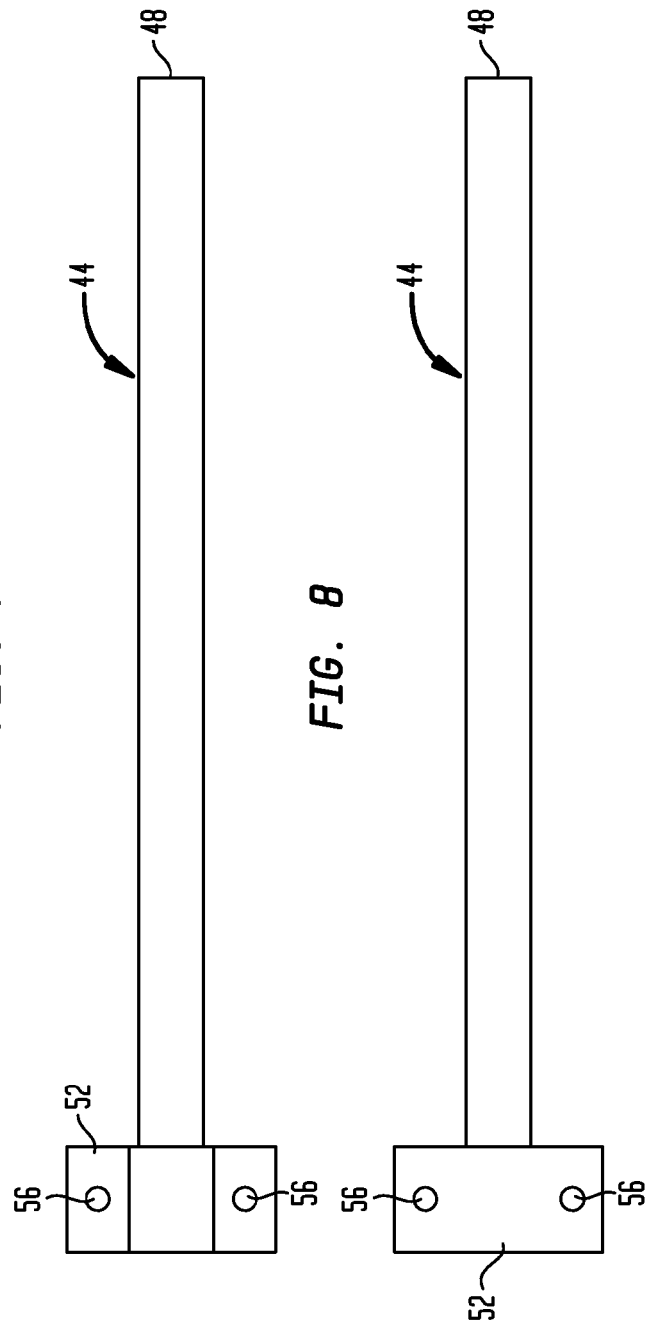
FIGS. 6 through 10 depict various views of a universal mounting rod according to one embodiment of the present invention.

In one non-limiting embodiment, as shown in FIGS. 1-3, the sun visor 10 can have a substantially rectangular shade member 4. In this embodiment, the shade member 4 can include an outer surface 8 and an inner surface 12. The shade member can have three mounting brackets 16 for mounting the visor 10 to a golf cart as will be discussed below. It will be understood that two of the three brackets can be used to fasten the visor in place. Further, any number of brackets can be used depending on the structural and functional requirements of any particular application.

In this embodiment, mounting brackets 16 can be integrally molded with shade member 4. Optionally, the brackets may be separate components which may be attached by conventional means, such as fasteners as shown and described below.

As shown in FIGS. 1-3, the shade member 4 can include retaining clips 20. The retaining clips can be used to retain, for example, a sheet of advertising material a sports logo, or a cart identification (not shown). The number and location of clips 20 can be modified to suit a plurality of applications.

As shown in FIGS. 4-5 the mounting brackets 16 can be configured to include mounting arms 24. The mounting arms each have a substantially flat distal portion 28 and an arcturate or curved proximal portion 32. The arms protrude from shade member 4 such that the aperture formed by the distal portion is smaller than that formed by the proximal portion. In this way, the arms can act to capture a mounting bar and be adjusted to provide a frictional force which allows for rotation of the shade to a plurality of positions to block the sun or stow the shade. The frictional connection allows for the stability of the shade at each of the plurality of rotational positions during use of the golf cart and when at rest.

As shown in FIG. 5, fasteners, such as nuts 36 and bolts 40 can be used to secure the brackets 24 to a substantially circular member such as a golf cart mirror bar or a universal mounting member 44 as discussed below.

As depicted in FIGS. 6-10, in one embodiment of the present invention, universal mounting member 44 includes an elongated rod 48. The elongated rod 48 is connected to flange 52 which can include apertures 56 for connecting the mounting member to a golf cart frame or the like. The flange can be configured to be substantially parallel or substantially perpendicular to mounting member 56. This allows the device to be mounted using fasters or other known connecting means to a substantially rectangular golf cart frame on a plurality of perpendicular surfaces. Since golf carts may be configured differently, the universal member provides that the position of the flange can be modified to fit a wide variety of cart configurations without costly customization or the need to relocate other components on the cart.

Figure 11:
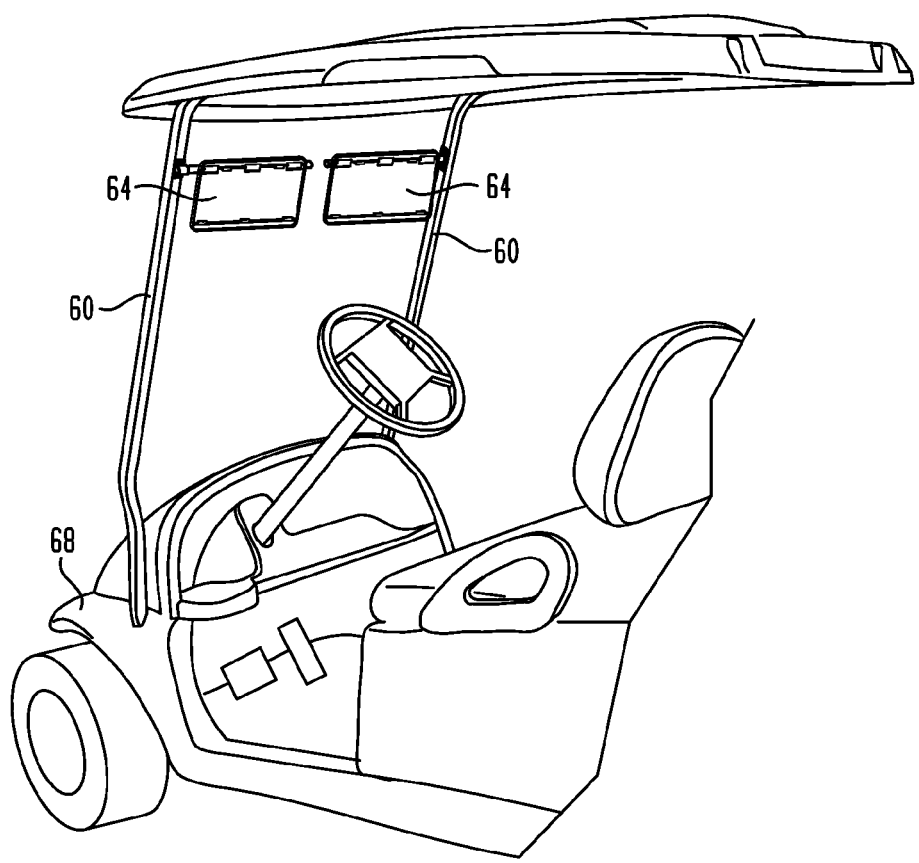
FIGS. 11 and 12 depict isometric views of an embodiment of the present invention mounted to the frame of a golf cart.
Figure 12:
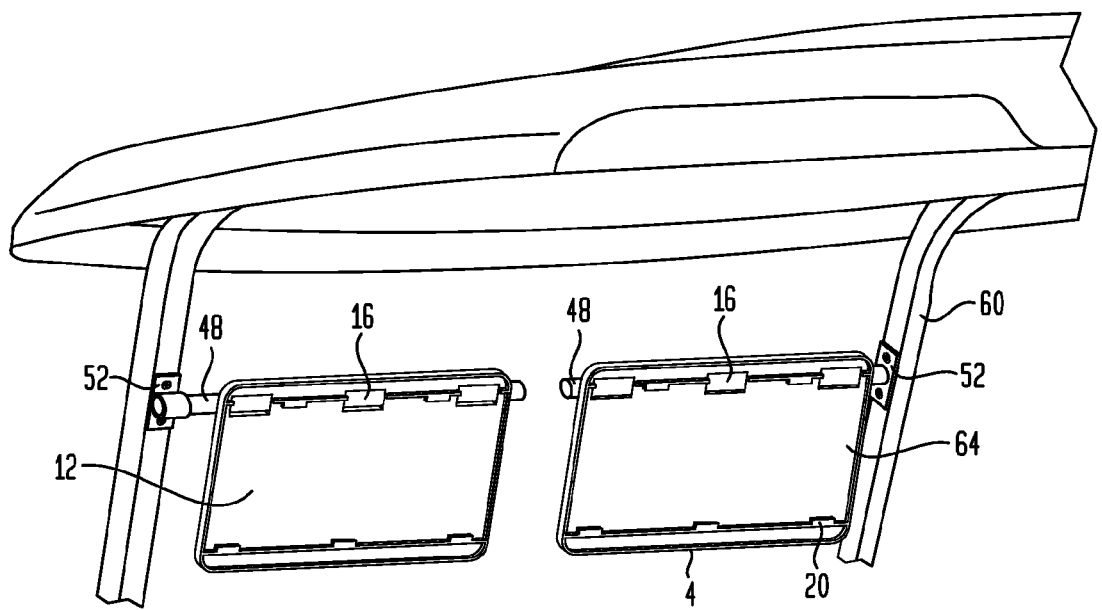
Figure 13:
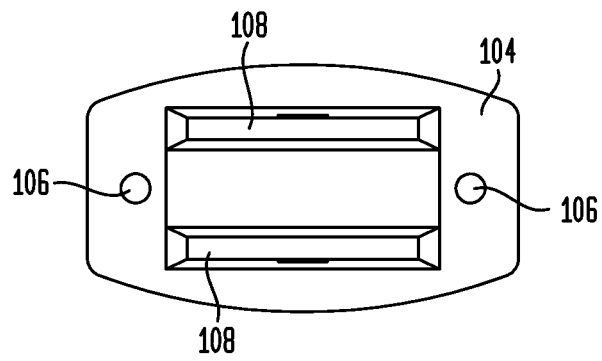
FIGS. 13 through 16 depict several views of a mounting bracket adapted for mounting a sun visor to a golf cart universal mounting rod, an existing mirror bar, or a cross member.
Figure 14:
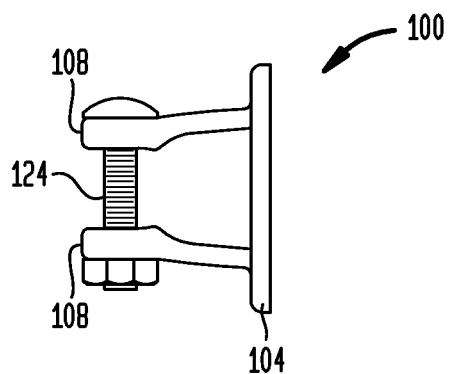
Figure 15:
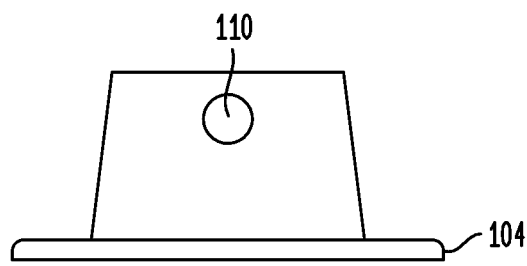
Figure 16:
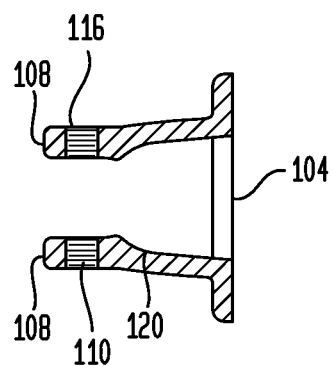

As shown in FIGS. 11-12, the brackets 16 of shade member 4 of the visor is rotationally connected to the rod 48. In this way, the rod is frictionally retained substantially within the curved portions of the arms to allow rotation to a plurality of fixed positions of the shade about the rod. Screws or other known fasteners (not shown) can be used to fasten one or more of the brackets 16, preferably two of the three brackets shown.

The universal mounting member can be connected to via the flange to a golf cart frame 60. A configuration wherein two visor assemblies 64 are mounted to the rectangular frame 60 of golf cart 68 for the driver=and the passenger is depicted, however, other configurations such as, for example, one visor assembly on either side of the cart are contemplated herein. As shown in FIG. 12, the flange 52 can be mounted to the frame 60 in a plurality of configurations.

In another non-limiting embodiment of the present invention, a visor, comprising a sun deflecting material can be secured to an existing mirror bar, a cross member, or a universal mounting member as described above. FIGS. 13-16 depict several views of a mounting bracket 100. The bracket includes base 104 and arms 108. The base can include apertures 106. The arms 108 include substantially flat portions 116 and curved portions 120 for retaining a fixed member. A shade (not shown) can be connected to one or more brackets via the apertures 106 in base 104 by, for example, screws. The fixed member can be rotationally connected to the bracket between arms 108 using, for example, fastener 124. In this way, the shade can be rotated to a plurality of stable positions to block the sun or stow the shade out of view.

Some components of the present invention can be fabricated from polymers or other structural materials which will be known to one skilled in the art of manufacturing. Likewise, manufacturing processes such as, for example, injection molding, compression molding, casting, or machining will be well known to those skilled in the art of component manufacturing.

The visor 10 can be made of an opaque, translucent, or transparent material for blocking, deflecting, modifying, filtering, or polarizing the rays of the sun thereby by providing a complete blockage or a sun-glasses effect for the user.

Shade materials can include polycarbonate with a sufficient amount of colorant or ultraviolet protectant to be opaque or tinted. Known materials include Lexan™ resin, such as, for example Lexan™ 141R. To achieve a grey tint, the base resin may be modified with a sufficient amount of, for example, a nickel based tint such as Smoke Grey Tint UV2. To achieve a brown tint, the base resin may be modified with a sufficient amount of, for example, a brown tinted material such as Smoke Brown Tint UV2. Any color tint may be utilized. A preferred range for colorant/ultraviolet protection materials is between about 0.2% and 0.5% by weight. Other known materials such as wood, metal, ceramic, polymers and elastomers are contemplated to be within the scope of the present invention.

Although the invention herein has been described with reference to particular embodiments, it is to be understood that these embodiments are merely illustrative embodiments and that other arrangements may be devised without departing from the spirit and scope of the present invention as defined by the disclosure herein.

The invention claimed is:

1. A sun visor adapted for a golf cart comprising:
a shade member, said shade member having an outer surface and an inner surface;
at least one mounting bracket integrally connected to said inner surface of said shade member and protruding substantially perpendicular to said inner surface of said shade member, said at least one mounting bracket being configured to include at least two mounting arms, said at least two mounting arms each having a substantially flat distal portion including an aperture therethrough and a curved proximal portion, wherein said at least two mounting arms protrude substantially perpendicular from said inner surface of said shade member such that an aperture is formed between said arms; and
a universal mounting member, said mounting member including an elongated rod, said rod being connected to a flange, said flange including at least one aperture therethrough for connecting said mounting member to a golf cart frame, wherein said shade member is rotationally connected to said mounting member by at least one fastener protruding through said apertures in said substantially flat portions of said mounting arms and being frictionally retained substantially within said curved portions of said mounting arms, thereby allowing rotation of said shade member to a plurality of stable rotational positions.

2. The sun visor of claim 1, wherein a width of said flange is configured to be substantially parallel to a longitudinal orientation of said mounting member adapted for connecting to a golf cart frame.

3. The sun visor of claim 1, wherein a width of said flange is configured to be substantially perpendicular to a longitudinal orientation of said mounting member adapted for connecting to a golf cart frame.

4. The sun visor of claim 1, further comprising a plurality of spaced apart clips for retaining a placard on said outer surface or said inner surface of said shade member.

5. The sun visor of claim 1, wherein said at least one mounting bracket comprises a first, a second, and a third mounting bracket, said second bracket including arms having a solid flat portion, wherein said shade can be fastened to said universal mounting member using said first and said third brackets, thereby allowing said arms to abut said mounting member to provide a frictional force which allows for rotation of said shade to a plurality of rotational positions.

6. A golf cart sun visor kit comprising:
a shade member, said shade member having an outer surface and an inner surface;
at least one mounting bracket connected to said shade member, said at least one mounting bracket being configured to include a at least two mounting arms, said at least to mounting arms each having a substantially flat distal portion including an aperture therethrough and a curved proximal portion, wherein said at least two mounting arms protrude substantially perpendicular from shade member such that an aperture is formed between said arms;
a universal mounting member, said mounting member including an elongated rod, said rod being connected to a flange, said flange including at least one aperture therethrough for connecting said mounting member to a golf cart frame; wherein said shade member is rotationally connected to said mounting member by at least one fastener protruding through said apertures in said substantially flat portions of said mounting arms and being frictionally retained by said curved portions of said mounting arms thereby allowing allow rotation of said shade member to a plurality of rotational positions; and
at least one fastener for mounting said at least one mounting bracket to said universal mounting member.

7. A sun visor adapted for a golf cart comprising:
a shade member including an inner side and an outer side;
at least one retaining member being integrally molded with said shade member, said at least one retaining member being attached to said inner side of said shade member;
said at least one retaining member having a first member and a second member, said first and second members each including an aperture therethrough, said first and second members being disposed substantially perpendicular to said shade member and each including a first substantially flat region and a second curved region; and
at least one fastener, said fastener being disposed with said apertures, wherein said curved regions engage a substantially circular mounting bar on a golf cart and said fasteners can be used to install said visor on said mounting bar, wherein said sun visor further comprises a plurality of spaced apart clips for retaining a placard on said shade member.

* * * * *